Sept. 12, 1933. O. B. MORGAN 1,926,053
PLANT PROTECTOR
Filed April 10, 1931
Fig. 1.
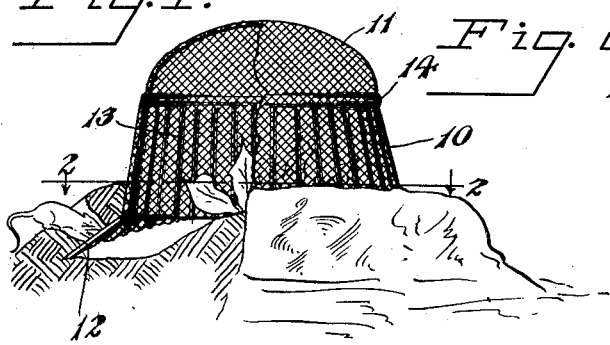
Fig. 2.
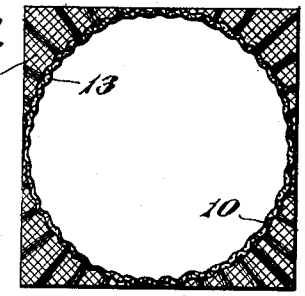
Fig. 3.
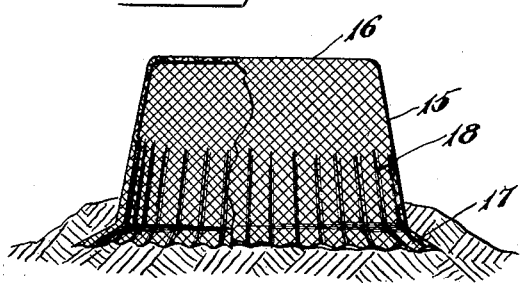
Fig. 4.
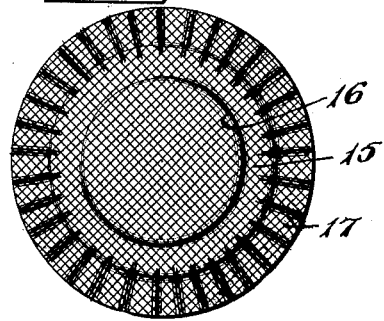
Fig. 5.
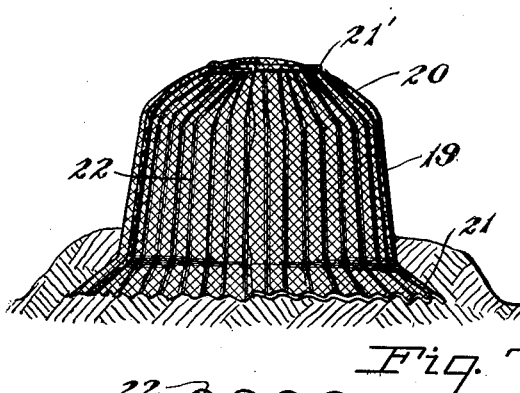
Fig. 6.
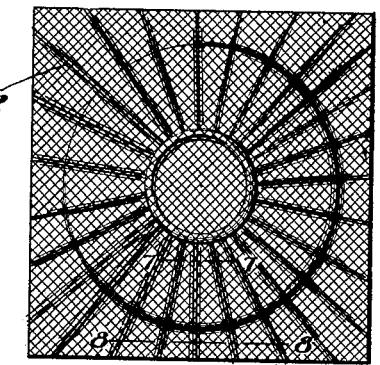
Fig. 7.
Fig. 8.
Inventor
O. B. Morgan
By Lacey & Lacey,
Attorneys Patented Sept. 12, 1933

1,926,053

UNITED STATES PATENT OFFICE 1,926,053

PLANT PROTECTOR

Orville B. Morgan, Rubio, Iowa

Application April 10, 1931. Serial No. 529,180

1 Claim. (Cl. 47—31)

This invention relates to plant protectors and has for an object to provide a housing for guarding young vines and other plants from pests, such as beetles, rodents and insects, as well as for protecting the plants from being mashed and broken off during cultivation.

A further object is to provide a plant protector which may be securely anchored in place by throwing the earth, before or during cultivation, against the device and without the use of the usual anchoring devices, such as stakes and the like.

A further object is to provide a self-supporting plant protector which may be formed from a single blank of material and will have corrugations for maintaining the shape of the device under severe conditions of service without the use of stiffening rings, frames or similar devices.

A still further object is to provide a plant protector which will be of such shape as to be easily nested for storage in small spaces.

A still further object is to provide a plant protector which will be inexpensive to manufacture and will be devoid of complicated parts which might get out of order.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation, partly broken away, showing one embodiment of the invention, Fig. 2 is a cross sectional view taken on the line 2—2 of Fig. 1, Fig. 3 is a side elevation, partly broken away, showing another embodiment of the invention, Fig. 4 is a plan view, reduced in size, of the device shown in Fig. 3, Fig. 5 is a side elevation, partly broken away, of an embodiment of the invention, Fig. 6 is a plan view of the device shown in Fig. 5, Fig. 7 is a fragmentary detail sectional view taken on the line 7—7 of Fig. 6, and Fig. 8 is a fragmentary detail sectional view taken on the line 8—8 of Fig. 6.

Referring now to Fig. 1, it will be seen that the housing is preferably formed of a single blank of foraminous material, such as, for instance, wire mesh, but it is to be understood that I am not restricted to the use of any material.

The blank of foraminous material may be pressed out if desired, between suitable dies to provide a substantially frusto-conical wall 10, a dome-shaped top 11, and corner tabs 12, as shown in Fig. 2, which project laterally from the base of the wall and preferably are gently sloped downwardly, as shown in Fig. 1.

In order to make the housing self-supporting under severe conditions of service, that is, to prevent collapse or distortion of the housing from shape, I form corrugations 13 in the wall and tabs. These corrugations may be of any desired depth or of any desired length and may be of any desired cross sectional contour, but preferably, in the practice of the invention, the corrugations are disposed to extend in an annular series down the wall and continue outwardly to the extremities of the corner tabs. Preferably also, the corrugations gradually increase in depth as they progress downwardly along the wall and outwardly along the tabs.

As shown in Fig. 1, at the juncture of the wall 10 and dome-shaped top 11 there is provided an annular rib 14 which also coacts with the corrugations 13 in stiffening the structure to resist distortion. Preferably, the corrugations begin at this rib at the upper ends, although this is not essential to the practice of the invention since the corrugations may begin lower down on the wall or may even begin at some point on the dome-shaped top itself.

It will be observed, by referring to Fig. 1, that the corner tabs slope gently downwardly exteriorly of the bottom edge of the wall 10 and thus, when these tabs are buried by the earth being thrown up against the wall of the device and over the tabs, the tabs themselves frustrate burrowing rodents from access to sprouting seeds or tender young plants and vines. The tabs 12 perform also the function of anchoring means which, when covered with earth, firmly secure the housing against accidental dislodgment by high winds or other causes.

By now referring to Fig. 3, it will be seen that in some cases I may form the housing to comprise a substantially frusto-conical wall 15 and a flat top 16, and, in this embodiment of the invention, I preferably form a circular base flange 17 at the bottom edge of the wall, this flange also preferably being sloped gently downward, as shown. The general shape of this embodiment is illustrated also in Fig. 4, in which the circular base flange may be clearly seen.

In the embodiment illustrated in Figs. 3 and 4, it will be seen that corrugations 18 are formed in the wall 15 and progress downwardly along the wall and outwardly to the periphery of the base flange 17. These corrugations may begin at any desired height on the wall but preferably are started at about a midway point between the top 16 and base flange 17, and preferably also these corrugations gradually increase in depth from their upper ends on the wall to their extremities on the flange, although this is not essential to the effectiveness of the device, as the corrugations may be made of uniform depth if desired. The corrugations may also be formed of any desired cross sectional contour.

In the embodiment of the invention illustrated in Figs. 5 and 6, it will be seen that the housing comprises a substantially frusto-conical wall 19, a dome-shaped top 20, and a substantially rectangular base flange 21. The dome-shaped top is preferably provided with an annular stiffening rib 21' near the center. In this embodiment of the invention, I provide corrugations 22, and, preferably, these corrugations extend from the stiffening rib 21' in the top downwardly along the top, thence downwardly along the wall 19, and finally pass outwardly to the perimeter of the base flange 21.

The corrugations 22 preferably also increase uniformly in depth as they progress from the upper ends at the rib 21' to the marginal edge of the base flange 21, and this construction is best shown in Figs. 7 and 8, wherein enlarged cross sectional views are taken through the corrugations at spaced points to illustrate the increase in depth of the corrugations, as just described. Although rounded peaks and valleys are illustrated as constituting the preferred contour of these corrugations, it will be stated that other contours, such as pointed or even other desired contours of the corrugations, may be employed.

In the various embodiments of the invention above described, it will be observed that the material in each instance forms an adequate defense against the inroads of beetles, especially the cucumber vine beetle, as well as all kinds of insects. It will further be observed that regardless of whether the anchoring device at the base of the wall is composed of corner tabs, a circular base flange, a squared base flange or any other shape of base projection, the corrugations connect such anchoring device with the wall of the housing so that the anchoring device is sufficiently stiff to resist distortion and securely anchor the housing in place when the earth is thrown over the device and against the wall.

It will be particularly pointed out that the use of foraminous material, such as wire mesh, is preferably employed in the structure of the housing for the purpose of admitting adequate light and air to the young growing plants while, at the same time, such material is of sufficient wear-resisting quality to be unaffected by the weather and is also sufficiently resistant to mutilation to resist being gnawed by rodents, but any material may be used.

In operation, the housing may be set down over the growing plant and earth piled upon the anchoring projection at the base as well as thrown up against the wall, as illustrated in Figs. 1, 3 and 5, to securely anchor the device against dislodgment. It will further be observed that, by virtue of the corrugations above described, the housing will be sufficiently self-supporting and have sufficient rigidity to withstand collapse under accidental blows or other severe conditions of service and will at all times positively prevent mashing or breaking off of the tender vines or other plants.

The device may be left in the growing plants until they are of sufficient size to resist rodents, beetles, insect pests and the like. When removed from the plant, the frusto-conical wall, closed top at the upper end of the wall, and laterally directed anchoring projection at the base all coact in imparting such shape to the device as to permit easy nesting for storage in small spaces.

Attention will here be called to the fact that, as shown in Figures 1, 2, 5 and 6, the square wire mesh base flange in each instance inclines outwardly and downwardly from the dome-shaped housing and the pointed corner portions form cutting projections adapted to penetrate the soft earth of the plant hill and promote easy entry of the entire flange below the surface of the hill so that a firm metal wall exists below the ground to adequately frustrate burrowing rodents, as best illustrated in Figure 1.

From the above description it is thought that the construction and operation of the invention will be easily understood without further explanation.

Having thus described the invention, I claim:

A rodent resistant plant protector including a wire mesh dome-shaped housing for the plant, and a wire mesh base flange extending outwardly and downwardly from the housing and being of substantially square outline, whereby the corners of the flange provide cutting pointed projections for penerating the soft earth of the plant hill to facilitate entry of the flange underneath the plant hill to frustrate burrowing rodents.

ORVILLE B. MORGAN.